Nov. 17, 1964     C. E. BRANICK     3,157,044
SHOCK ABSORBER TESTING AND CONDITION INDICATING DEVICE
Filed Nov. 24, 1961     2 Sheets-Sheet 1
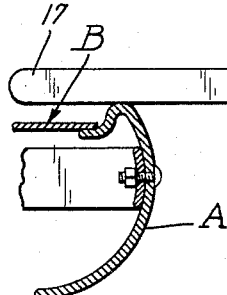
FIG. 1
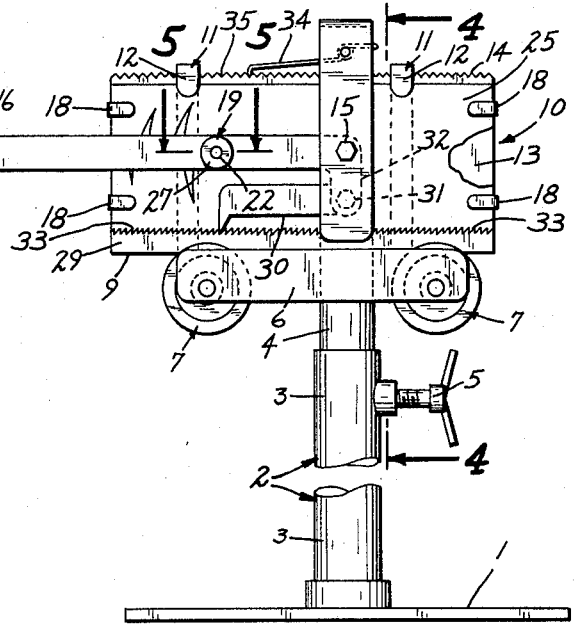
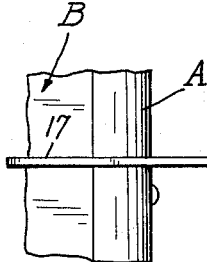
FIG. 2
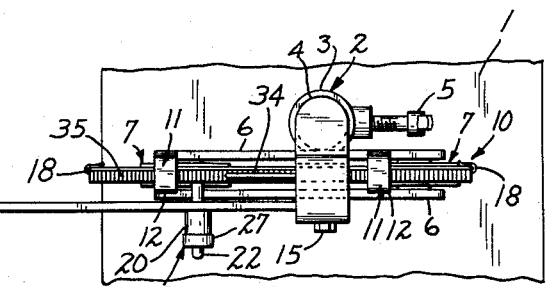
FIG. 3
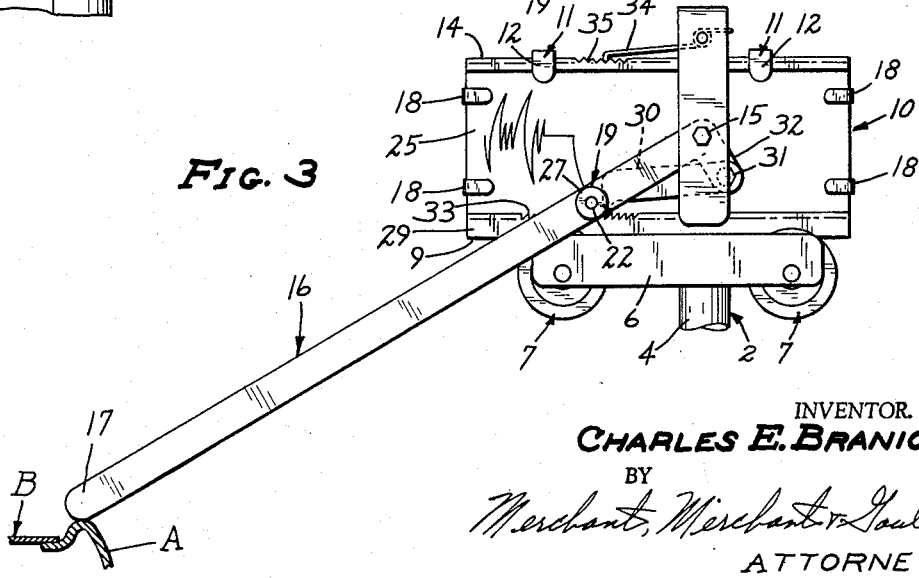
INVENTOR.
CHARLES E. BRANICK
BY
Merchant, Merchant & Gould
ATTORNEYS Nov. 17, 1964

C. E. BRANICK 3,157,044

SHOCK ABSORBER TESTING AND CONDITION INDICATING DEVICE

Filed Nov. 24, 1961

INVENTOR.
CHARLES E. BRANICK
BY
Merchant, Merchant & Gould
ATTORNEYS

United States Patent Office 3,157,044
Patented Nov. 17, 1964

3,157,044
SHOCK ABSORBER TESTING AND CONDITION INDICATING DEVICE
Charles E. Branick, % Branick Mfg. Co., Box 1937, Fargo, N. Dak.
Filed Nov. 24, 1961, Ser. No. 154,567
4 Claims. (Cl. 73—11)

My invention relates broadly to shock absorber testing and condition indicating devices for automotive vehicles and has for its primary object the provision of a device of this class which may be used in conjunction with any bumper jack or the like which has means for lifting the vehicle and imparting a free drop to the same.

A further object of my invention is the provision of a device of the class described which, incidental to the testing of a given vehicle shock absorber, will automatically prepare a permanent graph-like record indicating said condition.

A further object of my invention is the provision of a device of the class immediately above described which incorporates a minimum of working parts, which is light in weight and consequently highly mobile, and is relatively compact to facilitate storage and shipment.

A further object of my invention is the provision of a device of the class described which is extremely easy to operate and is relatively foolproof in its operation.

The above and still further objects of my invention will become apparent from the following detailed specification, appended claims and attached drawings.

Referring to the drawings wherein like characters indicate like parts throughout the several views.

FIG. 1 is a view in side elevation showing my novel structure in use on an automotive vehicle, some parts being broken away and some parts shown in section;

FIG. 2 is a view in top plan of the structure of FIG. 1;

FIG. 3 is a fragmentary view corresponding to FIG. 1 showing a different position of some of the parts;

Figure 4:
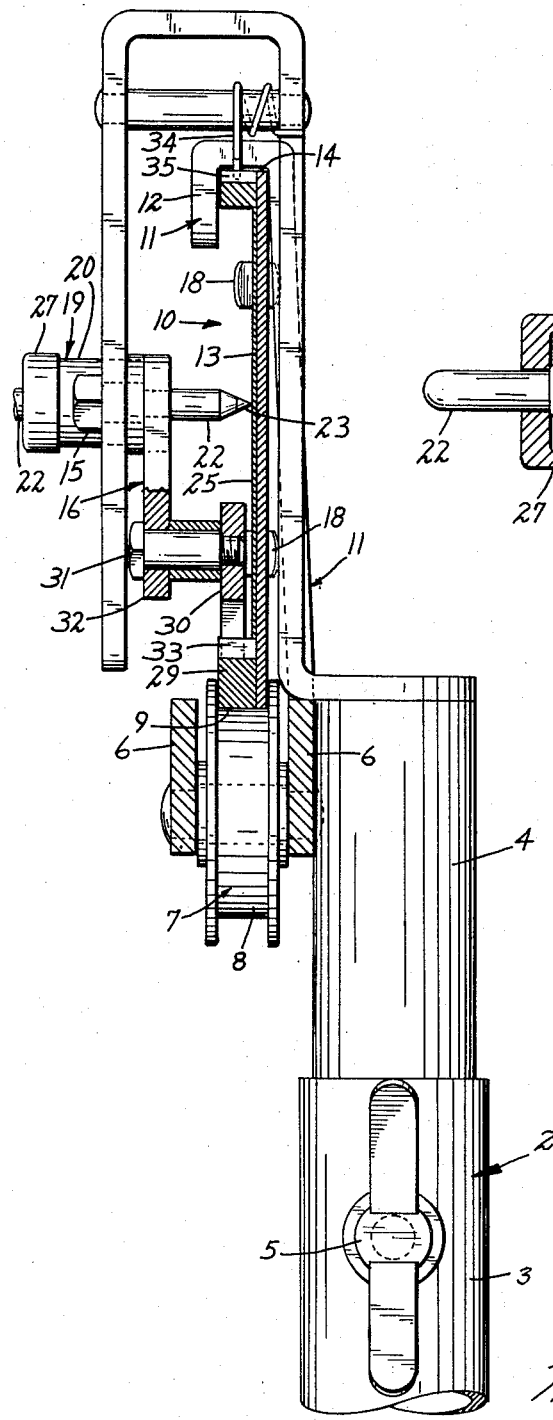
FIG. 4 is an enlarged fragmentary sectional view as seen from the line 4—4 of FIG. 1.
Figure 5:
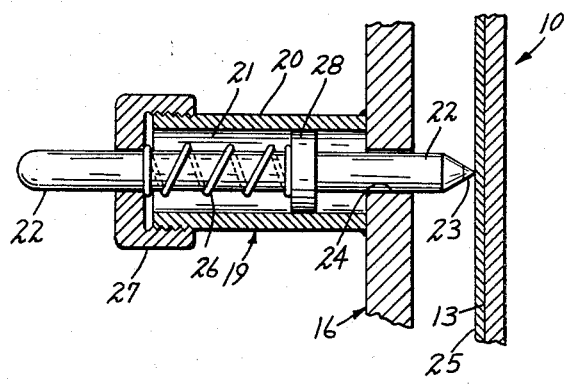
FIG. 5 is an enlarged fragmentary sectional view as seen from the line 5—5 of FIG. 1.

Referring with greater particularity to the drawings, the numeral 1 indicates a plate-like base having rigidly secured thereto and projecting vertically therefrom a support 2. Support 2 comprises a tubular lower section 3 having telescopically received therein for vertical raising and lowering movements an upper section 4. A set-screw 5 is provided for locking the sections 3, 4 in desired set positions, depending upon the height of the bumper A of an automotive vehicle B whose shock absorbers are being tested. Rigidly secured to an upper end portion of the support section 4 is a rigid cross head 6. A pair of laterally spaced vertically disposed roller elements 7 are journalled for rotation in the cross head 6, said rollers having grooved peripheral surfaces 8 for the reception of the lower edge 9 of a plate-like carriage 10 mounted for reciprocating movements in a horizontal plane thereon. Further guiding and mounting said plate-like carriage 10 in its reciprocating movements are a pair of laterally spaced guide fingers 11 carried by the cross head 6 and have downturned upper end portions 12 which overlie the flat work surface 13 of the carriage 10 adjacent the upper edge 14 thereof.

Pivotally secured on a horizontal axis 15 to the upper section 4 of support 2 for swinging movements in a vertical plane spaced from but parallel to the work surface 13 is a lever arm 16, the free end 17 of which is adapted to rest upon and be supported by an automotive vehicle B. Adapted to detachably secure index cards or the like to the work surface 13 of the carriage 10 are spring opposed clips 18. Carried by the arm 16 in outwardly spaced relation to the pivotal connection 15 is a scriber element 19. As shown, the scriber element 19 comprises a horizontally disposed tubular element 20 defining a chamber 21 in which is axially mounted a pencil or other marking device 22, the pointed inner end 23 of which extends through an aperture 24 in the arm 16. Point 23 of the pencil 22 is yieldingly biased toward engagement with an index card or sheet 25 on the work surface 13 by means of a coil compression spring 26 interposed between the screw threaded apertured cap 27 and an annular shoulder 28 on the intermediate portion of the pencil 22.

Rigidly secured to the lower end portion of the carriage 10 is a ratchet element 29. Adapted to cooperate with the ratchet element 29 is an indexing pawl 30 which is pivotally secured as at 31 to the offset portion 32 of the bell-crank lever 16. Pawl 30 is under gravity bias to engage the teeth 33 of the ratchet element 29, the contour of which is such as to impart advancing movements to the carriage 10 during upward movements of the lever arm 16. On the other hand, during lowering movements of the lever arm 16, the pawl 30 is drawn over the teeth 33 without imparting movement to the carriage 10.

For the purpose of positively holding the carriage 10 in a stationary position during return movements of the indexing pawl 30, I provide a spring pawl 34 which is normally biased toward engagement with the teeth 35 formed on the upper edge 14 of the carriage 10.

The operation of my above described device is as follows: The support 2 is first adjusted to the height of the particular vehicle B whose shock absorbers are to be tested. A clean indexing sheet is placed upon the work surface 13; and the extended end 17 of the lever 16 is placed upon the bumper A of said vehicle B. Next, the automotive vehicle B is jacked up by any suitable bumper jack or the like, not shown, to a point where the shock absorber being tested is in its extended position. A quick drop of the vehicle will cause the spring supported portion of the vehicle to engage the ground and rebound in accordance with the condition and efficiency of the shock absorber being tested and this condition will, of course, be accurately reflected upon the index sheet 25 by the marking pencil 22 as the carriage 10 is advanced by the indexing pawl 30. Obviously, under the arrangement above described, the greater the vertical swinging movement imparted to the lever arm 16 by the bouncing action of the bumper A, the greater the advancing movement imparted to the carriage 10 by the indexing pawl 30.

My invention has been thoroughly tested and found to be completely satisfactory for the accomplishment of the above objects, and while I have shown a preferred embodiment thereof, I wish it to be understood that same may be capable of modification without departure from the scope and spirit of the appended claims.

What I claim is:

1. In a device of the class described, a support, a lever arm pivotally secured to said support for free swinging movements and having an outer end portion adapted to rest upon and be supported by a spring mounted portion of a vehicle, cooperating index and scriber elements, means mounting one of said elements on the inner end of said lever arm for common movements therewith, means mounting the other of said elements on said support for indexing movements in a path generally normal to the path of travel of said one of said elements, and means imparting indexing movements to said other of said elements responsive to swinging movements of said lever arm.

2. The structure defined in claim 1 in which said index element is mounted on said support and in which said scriber element is carried by said arm.

3. In a shock absorber testing and condition indicating device a vertically adjustable support, a carriage mounted and guided on said support for reciprocating movements in a horizontal plane, said carriage being formed to define a relatively flat vertical work surface, means for detachably securing index sheets to said work surface, an elongated lever arm pivotally secured adjacent one end to said support for free swinging movements in a vertical plane spaced from and parallel to said work surface and having a free end portion adapted to rest upon the bumper of an automotive vehicle, a scriber element carried by said arm in longitudinally spaced relation to the pivotal connection thereof to said support, means yieldingly biasing said scriber element toward engagement with said work surface and index sheets mounted thereon, and means for imparting indexing movements to said carriage responsive to swinging movements of said arm.

4. The structure defined in claim 3 in which said means comprises an indexing pawl pivotally secured on a horizontal axis to a laterally offset inner end portion of said arm, said pawl being biased toward engagement with a cooperating ratchet defined by said carriage.

References Cited by the Examiner

UNITED STATES PATENTS

| 426,144 | 4/90 | Schroyer | 346—113 X |
| 1,367,353 | 2/21 | Craig | 73—11 X |
| 1,891,613 | 12/32 | Widney. | |
| 2,133,843 | 10/38 | Berry | 73—11 |
| 2,685,493 | 8/54 | McDonald et al. | 346—112 X |

FOREIGN PATENTS

| 628,252 | 9/61 | Canada. |

RICHARD C. QUEISSER, *Primary Examiner.*

DAVID SCHONBERG, *Examiner.*